US010780749B2

(12) United States Patent
Hassani et al.

(10) Patent No.: US 10,780,749 B2
(45) Date of Patent: Sep. 22, 2020

(54) SYSTEMS AND METHODS FOR VEHICLE TPMS LOCALIZATION

(71) Applicant: Ford Global Technologies, LLC, Dearborn, MI (US)

(72) Inventors: Ali Hassani, Ann Arbor, MI (US); Dilip B. Patel, Novi, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 15/819,985

(22) Filed: Nov. 21, 2017

(65) Prior Publication Data

US 2019/0152277 A1 May 23, 2019

(51) Int. Cl.
*B60C 23/04* (2006.01)
(52) U.S. Cl.
CPC ...... *B60C 23/0416* (2013.01); *B60C 23/0418* (2013.01); *B60C 23/0437* (2013.01); *B60C 23/0444* (2013.01); *B60C 23/0483* (2013.01)
(58) Field of Classification Search
None
See application file for complete search history.

(56) References Cited

U.S. PATENT DOCUMENTS 6,489,888 B1 * 12/2002 Honeck .............. B60C 23/0416
340/10.4
6,877,370 B2 * 4/2005 Masudaya ......... B60C 23/0416
340/442
7,181,189 B2 2/2007 Hotta et al.
7,271,711 B2 9/2007 Daiss et al.
7,382,239 B2 * 6/2008 Song ................. B60C 23/0408
340/442
7,506,540 B1 * 3/2009 Job ................... B60C 23/0416
340/447
7,671,726 B2 * 3/2010 Mori ................. B60C 23/0416
340/442
7,716,976 B2 * 5/2010 Lin .................. B60C 23/0416
73/146.4
7,944,348 B2 * 5/2011 Watasue .......... B60C 23/0416
340/442

(Continued)

FOREIGN PATENT DOCUMENTS

CN 203126413 U 8/2013
CN 203211119 U 9/2013

(Continued)

OTHER PUBLICATIONS

BLE Type TPMS System, 2013, retreived from http://www.cubelec.com.tw/ble-en.php on Jun. 23, 2017, 1 page.
FOBO TIRE: World's First All Bluetooth Smart TPMS, 12 pages.

*Primary Examiner* — Peter J Macchiarolo
*Assistant Examiner* — Jermaine L Jenkins
(74) *Attorney, Agent, or Firm* — Frank Lollo; Eversheds Sutherland (US) LLP (57) ABSTRACT

Method and apparatus are disclosed for localizing vehicle TPMS sensors. An example vehicle includes a plurality of TPMS sensors, an antenna, and a processor. The processor is configured for determining signal strength values between each of the plurality of TPMS sensors and the antenna, and based on the signal strength values, determining a location of each of the plurality of TPMS sensors.

18 Claims, 7 Drawing Sheets

(56) References Cited

U.S. PATENT DOCUMENTS

| | | | |
|---|---|---|---|
| 7,954,368 B2* | 6/2011 | Leman | B60C 23/0416 |
| | | | 340/442 |
| 7,994,904 B2 | 8/2011 | Kim | |
| 8,421,612 B2 | 4/2013 | Sugiura | |
| 9,278,589 B2* | 3/2016 | Laifenfeld | B60C 23/0437 |
| 9,399,376 B2 | 7/2016 | Lickfelt et al. | |
| 9,469,166 B2 | 10/2016 | McIntyre | |
| 2008/0143507 A1* | 6/2008 | Cotton | B60C 23/0416 |
| | | | 340/445 |
| 2008/0150712 A1* | 6/2008 | Cooprider | B60C 23/0408 |
| | | | 340/447 |
| 2011/0304442 A1 | 12/2011 | Lickfelt | |
| 2013/0120127 A1* | 5/2013 | Sun | B60C 23/0437 |
| | | | 340/447 |
| 2013/0328674 A1* | 12/2013 | McIntyre | B60C 23/007 |
| | | | 340/442 |
| 2014/0354420 A1* | 12/2014 | Terada | B60C 23/0408 |
| | | | 340/442 |
| 2015/0285906 A1 | 10/2015 | Hooper | |
| 2018/0361803 A1* | 12/2018 | Saburi | B60C 23/0416 |

FOREIGN PATENT DOCUMENTS

| | | |
|---|---|---|
| CN | 203472438 U | 3/2014 |
| DE | 102015105885 A1 | 10/2016 |
| IN | 3787DEL2014 A1 | 8/2016 |
| JP | 2006127014 A | 5/2006 |
| JP | 2013082381 A | 5/2013 |
| WO | WO 2016/198970 A1 | 12/2016 |

* cited by examiner

SYSTEMS AND METHODS FOR VEHICLE TPMS LOCALIZATION

TECHNICAL FIELD

The present disclosure generally relates to vehicles with tire pressure monitoring system (TPMS) sensors and, more specifically, systems and methods for vehicle TPMS sensor localization.

BACKGROUND

Vehicles have a tire pressure monitoring system (TPMS) with sensors monitoring each tire. The TPMS sensors measure the pressure of the corresponding vehicle tire, and may transmit the measured pressure to the vehicle for display to a driver. The TPMS sensors are located on the interior of the tire rim, and may transmit information at a slow rate to conserve tire sensor battery life. Each TPMS sensor may provide information about the tire pressure which can be used to determine the corresponding location of the tire. When tires are rotated or changed entirely, the TPMS sensors may no longer correspond to their previous positions on the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for localizing TPMS sensors of a vehicle using a limited number of antennas or nodes. An example disclosed vehicle includes a plurality of TPMS sensors, an antenna, and a processor. The processor is configured for determining signal strength values between each of the plurality of TPMS sensors and the antenna, and based on the signal strength values, determining a location of each of the plurality of TPMS sensors.

An example disclosed method for vehicle tire localization includes determining signal strength values between each of a plurality of TPMS sensors and an antenna coupled to a vehicle, the TPMS sensors each corresponding to a respective vehicle tire, and based on the signal strength values, determining a location of each of the plurality of TPMS sensors.

A third example may include means for determining signal strength values between each of a plurality of TPMS sensors and an antenna coupled to a vehicle, the TPMS sensors each corresponding to a respective vehicle tire, and means for, based on the signal strength values, determining a location of each of the plurality of TPMS sensors.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, each tire of a vehicle may include a TPMS sensor. The TPMS sensors may provide the latest tire pressure values of the respective tires. However, the latest tire pressure values may not reflect up to the minute values, and in some cases may be minutes or even hours old. For instance, TPMS sensors may be configured to provide a tire pressure value once every six hours when the tire is stationary, and once every minute while the tire is rotating.

A driver may wish to know the current tire pressure of a given tire for several reasons. In some cases, the driver may wish to know about changes in tire pressure that occur on a scale faster than the rate with which the TPMS sensors provide information. Where there is a small leak, a six hour gap may result in a large change in tire pressure. Further, if a driver returns to a vehicle before the six hour time window has elapsed, any changes in tire pressure will not be reflected. In this case, the driver may start the vehicle and begin driving without realizing that a leak has caused a tire to go flat or could go flat during the driving event.

But issues may arise where the tires are rotated, swapped, or otherwise change positions. In these cases, a driver may not know which tire is flat or is going flat until it is too late, and may inflate or replace the incorrect wheel. There may be a benefit to providing a real-time or near real-time tire pressure value, in addition to localization of the tires, such that a driver can be confident in the accuracy of pressure measurements for each wheel, and know which wheel corresponds to which measurement. Some vehicles may localize tires by measuring differences in wheel rotation while the vehicle is in motion. But in requiring motion, these vehicles may not be able to provide up to date localization on an immediate or on-demand basis. Immediate or on-demand localization may also be beneficial for vehicles having multiple wheels on the same side of an axle (e.g., large trucks, trailers, etc.). The difference in wheel rotation here may be too small to provide accurate measurements.

Some vehicles may use antennas positioned to each communicate with a sensor, such that a vehicle having four wheels may include four corresponding antennas. However this requires a large number of antennas, increasing the cost and complexity of the system and potential points of failure.

With these issues in mind, example embodiments disclosed herein may attempt to solve or alleviate some problems with determining which wheel/TPMS sensor is in which position relative to the vehicle without large time delays and/or the need to put the car in motion. Example embodiments may make use of a single antenna, or a two antenna system, in order to determine a location of each TPMS sensor with respect to the vehicle.

Figure 1:
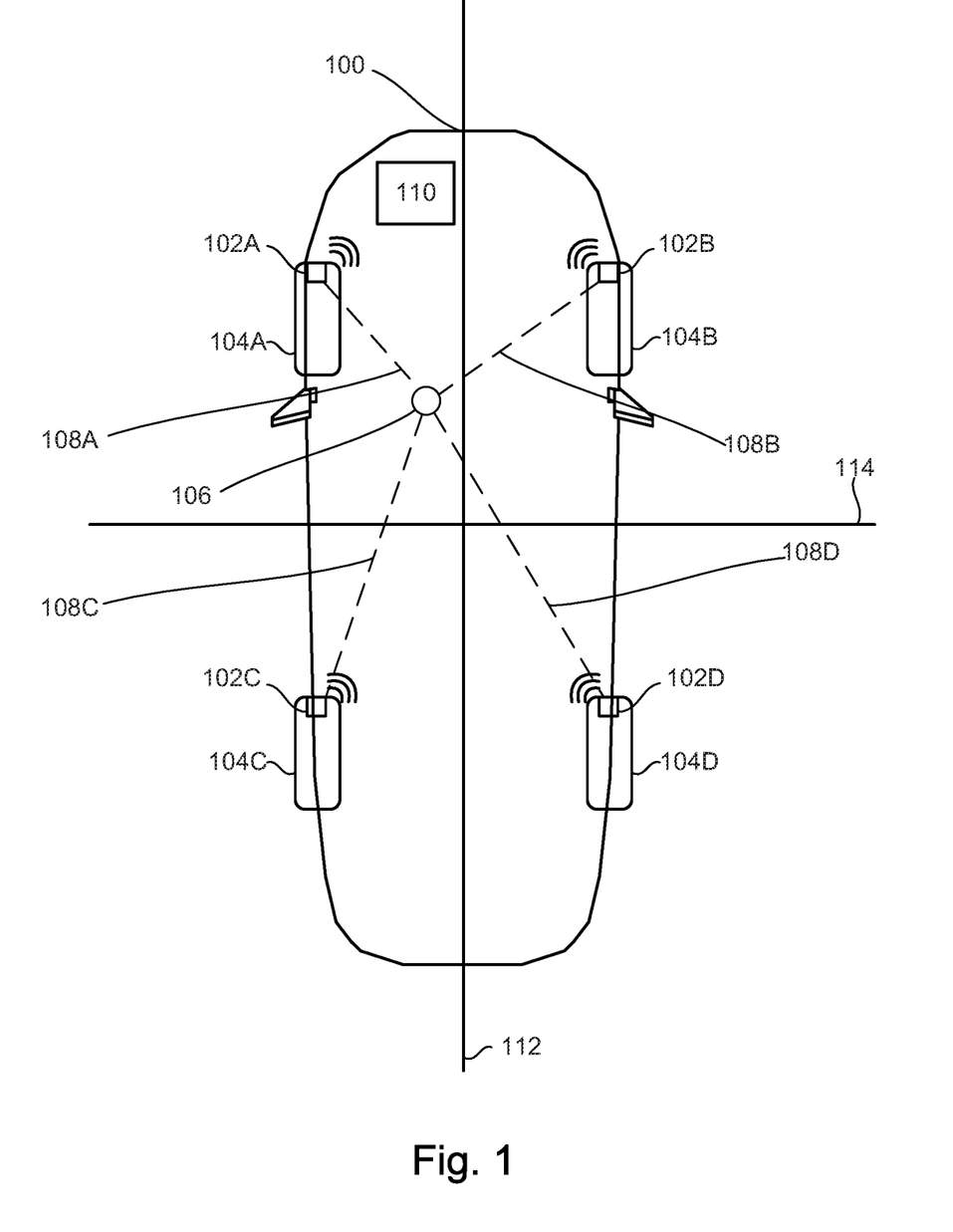
FIG. 1 illustrates an example vehicle according to embodiments of the present disclosure.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a plurality of tires 104A-D each having a corresponding TPMS sensor 102A-D. Vehicle 100 may also include a processor 110, and an antenna 106. One or more other electronic elements of vehicle 100 may be described in further detail with respect to FIG. 2.

TPMS sensors 102A-D may include circuitry configured to determine a tire pressure of a corresponding tire 104A-D. TPMS sensors 102A-D may also include circuitry to facilitate communication with one or more devices or systems, such as processor 110 via antenna 106 and/or a communication module of vehicle 100. This communication may be done using any wireless protocol, including low frequency signals, BLUETOOTH signals, UHF, and more. Each communication signal may have a corresponding signal strength value, angle of arrival value, time of flight value, or other characteristic. The signal strength may also be called a received signal strength indication (RSSI). The RSSI may be measured by the TPMS sensors 102A-D themselves, the communication module, the processor 110, and/or one or more other devices or systems of vehicle 100.

FIG. 1 illustrates a vehicle 100 having four wheels, each having a corresponding TPMS sensor. However it should be noted that the examples, systems, and method disclosed herein can apply to vehicles having more or fewer wheels and TPMS sensors and may also include monitoring unmounted spare tires.

In some examples, TPMS sensors 102A-D may determine one or more signal characteristics (such as the RSSI value) between the respective TPMS sensors and the antenna 106. This information may then be transmitted to a communication module and/or one or more other devices or systems of vehicle 100, such as processor 110.

Antenna 106 may be a low frequency and/or long range antenna configured to transmit a wake-up request to one or more TPMS sensors 102A-D. In some examples, the antenna 106 may be a long range antenna configured for use in a remote parking procedure. The TPMS sensors 102A-D may then be configured to receive the wake-up request and determine an RSSI value between the antenna 106 and the respective TPMS sensors 102A-D. The RSSI value may be the signal strength of a low frequency (LF) communication. The TPMS sensors may also be configured to communicate with processor 110 of vehicle 100 via BLUETOOTH, which may include transmitting the determined RSSI values to the processor 110. Antenna 106 may be configured to transmit data to all the TPMS sensors at the same time, or in a sequence.

In some examples, the TPMS sensors 102A-D may be configured to communicate with processor 110 via one or more other protocols, including WiFi, UHF, and others.

In some examples, the TPMS sensors 102A-D themselves may include one or more processors configured to determine a signal strength value of a signal between the respective TPMS sensor and the antenna 106. The processor 110 may then receive from each TPMS sensor a signal strength value and/or data corresponding to the signal strength value. Alternatively, TPMS sensors 102A-D may receive data corresponding to the signal strength value, which may then be passed on or transmitted to the processor 110, at which point a signal strength value may be determined by processor 110.

In some examples, the antenna 106 may be positioned, mounted, or otherwise coupled to vehicle 100 at a particular location. The location may be adjacent to a plane of symmetry between the plurality of TPMS sensors. FIG. 1 illustrates two of the many possible planes of symmetry, planes 112 and 114. Plane of symmetry 112 illustrates a plane that bisects the vehicle into a left side and a right side, along which the distance from any point on the plane to two TPMS sensors is the same. For instance, plane of symmetry 112 shows that any point on plane 112 is equidistant from TPMS sensors 102A and 102B, as well as being equidistant from TPMS sensors 102C and 102D. Plane of symmetry 114 bisects the vehicle into a front side and a back side, and similarly shows that TPMS sensors 102A and 102C are equidistant, while TPMS sensors 102B and 102D are equidistant.

Other planes of symmetry can be used as well. For example, where a single antenna is used, the antenna may lie anywhere except on an arbitrary bisector of the TPMS sensors. An arbitrary bisector may be any plane that passes through the set of sensors and bisects them into two symmetric pairs. And for an example having two antennas, the antennas may lie anywhere except on the same arbitrary bisector. However it is possible for the antennas to lie on separate arbitrary bisectors.

Antenna 106 may be positioned such that it is adjacent to a plane of symmetry between the TPMS sensors, so long as antenna 106 is not equidistant from any two TPMS sensors when taking into account the locus of distance vectors that may exist when each wheel rotates. Since antenna 106 may be on an undercarriage of vehicle 100, the vertical distance of TPMS sensors 102A-D may be taken into account as tires 104A-D rotate. For example, as TPMS sensor 102A of tire 104A rotates, all its possible RSSI values or distance measurements from antenna 106 may be considered. And the position of antenna 106 may be such that all distance measurements and RSSI values corresponding to the possible positions of TPMS sensor 102A are different than those corresponding to TPMS sensor 102B and its possible distances and/or RSSI values (as well as TPMS sensor 102C, 102D etc.). This may be understood This can be seen in FIG. 1 by understanding that signals 108A, 108B, 108C, and 108D all travel different distances between the respective TPMS sensors and the antenna 106. And further, signals 108A-D of FIG. 1 illustrates a snapshot of a point in time at which the TPMS sensors 102A-D are all located on the forward edge of tires 104A-D. It should be understood that as the tires 104A-D rotate, the position of the TPMS sensors 102A-D may change as well, bringing each TPMS sensor closer and further from the antenna 106 (both vertically and horizontally).

In some examples, the signals 108A-D may represent a locus of different distances for each TPMS sensor from the antenna 106 as the tires 104A-D rotate. Example embodiments may average multiple distance and/or RSSI values for each TPMS sensor over time, to account for the rotation of the tires and TPMS sensors.

Alternatively or in addition, the antenna 106 may be used to transmit a wake-up signal to each TPMS sensor. The TPMS sensors may then report back both the RSSI value from the TPMS sensor to the antenna 106, as well as one or more RSSI values between the TPMS sensor and one or more other TPMS sensors (e.g., based on BLUETOOTH RSSI). Then, using information corresponding to the antenna/TPMS sensor RSSI as well as the TPMS/TPMS sensor RSSI(s), the position of each TPMS sensor may be determined.

In some examples, known ranges of the distance of one or more TPMS sensors may be used. For instance, where each TPMS sensor is known to be within a given range of the antenna 106 (based on the farthest and closest values during rotation of the tire), and the vehicle is stationary, a given RSSI value that is outside the known range may be used to rule out one or more sensors. For instance, if an RSSI value from a first TPMS sensor corresponds to a distance larger than possible for a given tire location, that location may be ruled out with respect to the TPMS sensor corresponding to the RSSI value. Process of elimination may be used to determine the position of all the TPMS sensors in this manner.

In further examples, one or more sensors may be used to determine the tire rotation position and/or one or more gravitational forces, which may correspond to the TPMS sensor rotational position or vertical position. This information can be used to more accurately determine the position of a TPMS sensor relative to the antenna 106 (i.e., where the TPMS sensor is vis-à-vis the tire's rotation.) It may further be used to narrow down the range of possible distances of the signal between the TPMS sensor and the antenna 106.

TPMS sensors and/or processor 110 may determine the strength of signals 108A-D. And based on a known position of the antenna 106, the position of the TPMS sensors 102A-D may be determined. For instance, if it is known that the order of proximity of the TPMS sensors to antenna 106 is 102A, 102B, 102C and 102D (as illustrated in FIG. 1), the signal strength of signals 108A-D can be understood to correlate with the known order. For instance, if the processor 110 receives four signals from the TPMS sensors, but does not yet know which signal corresponds to which TPMS sensor or location, the processor 110 can deduce the position of the TPMS sensors based on the ranking of the relative signal strength values. As such, the strongest RSSI value received by the processor 110 can be determined to be from a TPMS sensor on the front left wheel position, while the second strongest can be determined to be from a TPMS sensor on the front right wheel position, etc. In this manner, the four TPMS sensors can be correlated with and matched to the corresponding wheel locations (i.e., localization).

In some examples, this may include using a stochastic model to associate a given RSSI value with an expected location of a TPMS sensor. Further, a bayesian classifier may be used to minimize the probability of determining an incorrect location based on the RSSI value, and to ensure accuracy.

FIG. 1 illustrates that antenna 106 may be positioned such that it is closer to plane of symmetry 112 than to plane of symmetry 114. However, it should be understood that antenna 106 can also be positioned closer to plane of symmetry 114 than the plane of symmetry 112. However it may also be understood that antenna 106 may not be positioned at any point equidistant from both plane of symmetry 112 and 114, as any point along that plane may be a separate plane of symmetry along which two of TPMS sensors 102A-D may be equidistant. For instance, a third plane of symmetry proceeding diagonally through TPMS sensor 102A and 102D may be equidistant from planes 112 and 114. But along this third plane, TPMS sensors 102B and 102C may also be equidistant.

Vehicle 100 may also include a communication module configured to communicate with one or more devices or systems of vehicle 100, as well as one or more remote devices or systems. The communication module may include circuitry and/or components such that it may communicate via any wireless communication protocol, including low frequency, high frequency, UHF, BLUETOOTH, and others.

Processor 110 may be configured to carry out one or more actions or steps disclosed herein. For instance, processor 110 may be configured to determine one or more signal strength values. Processor 110 may also be configured to determine the location of one or more TPMS sensors based on the signal strength values.

Signal strength values, or RSSI values, may include a measurement of the power present in a signal received by the TPMS sensors from the antenna. The antenna may transmit signals to each TPMS sensor having the same power (or a known power for each TPMS sensor), and a relative drop in the power received by the TPMS sensors may be used to determine the RSSI value. In some examples, signal strengths may vary based on ambient conditions, such as temperature, humidity, etc. The processor may compensate or take these ambient conditions into account when determining signal strength values. In further examples, instead of or in addition to an actual RSSI value, RSSI ratio(s) may be determined. Where ratios are used, a proportional decrease in signal strength may be present across all TPMS sensors, so the calculations/algorithms used to determine the TPMS sensor location may be affected to a lesser extent. The RSSI value may be lower for TPMS sensors that are further away from the antenna, which may be used to correlate the RSSI value with a determined distance from the antenna. The processor 110 may associate the strongest signal or highest RSSI value with a TPMS sensor that is in a location closest to the antenna.

As such, in one example a processor may have the location of four TPMS sensors stored in a memory. When the tires are rotated, the same four TPMS sensors may still be present, however they may no longer be in the same position stored in the memory. Examples of the present disclosure may mitigate issues that come from this scenario by re-localizing the tires, and determining new locations for the tires based on which TPMS sensor has the strongest signal or highest RSSI value. Based on the position of the antenna, it may be true that the front left wheel is always the closest. As such, when there is a discrepancy between a stored TPMS position and a highest RSSI value or strongest signal, the TPMS sensor may be re-evaluated and a new TPMS sensor may be localized as the front left wheel.

Figure 2:
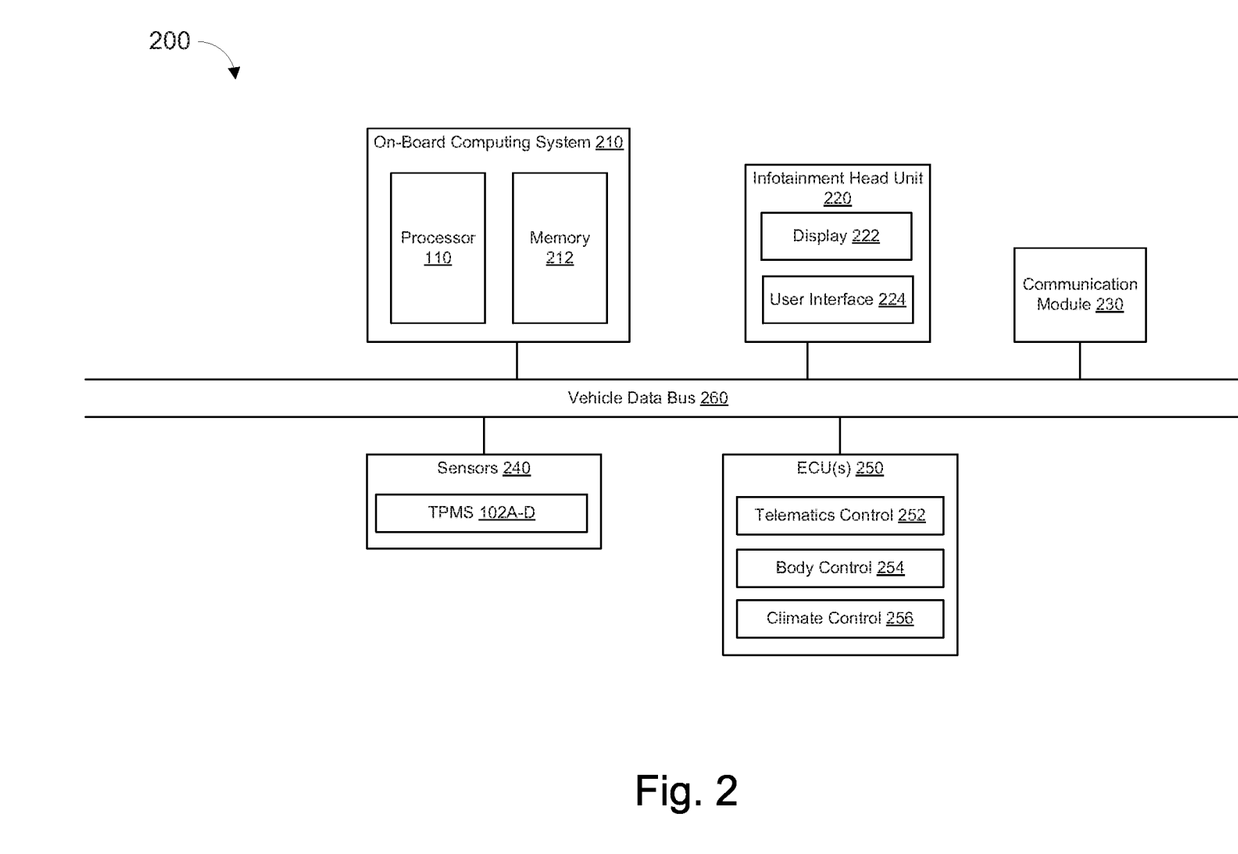
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, communication module 230, sensors 240, electronic control unit(s) 250, and vehicle data bus 260.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224. User interface 224 may include input and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 320 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 320 may share a processor with on-board computing system 310. Additionally, the infotainment head unit 220 may display the infotainment system on, for example, a display 222 of vehicle 100.

Communication module 230 may be configured to communicate with one or more systems or devices of vehicle 100, including the TPMS sensors 102A-D, as well as one or more other sensors. In some examples, communication module 230 may be configured to communicate using BLUETOOTH, UHF, low frequency, and/or one or more other protocols.

Sensors 240 may be arranged in and around the vehicle 100 in any suitable fashion. In the illustrated example, sensors 240 include TPMS sensors 102A-D. Other sensors may be included as well.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the climate control unit 256.

The telematics control unit 252 may control tracking of the vehicle 100, for example, using data received by a GPS receiver, communication module 230, and/or one or more sensors. The body control unit 254 may control various subsystems of the vehicle 100. For example, the body control unit 254 may control power to a trunk latch, windows, power locks, power moon roof control, an immobilizer system, and/or power mirrors, etc. The climate control unit 256 may control the speed, temperature, and volume of air coming out of one or more vents. The climate control unit 256 may also detect the blower speed (and other signals) and transmit to the on-board computing system 210 via data bus 260. Other ECUs are possible as well.

Vehicle data bus 260 may include one or more data buses that communicatively couple the on-board computing system 210, infotainment head unit 220, communication module 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7). In some examples, the CAN bus may be shared with the CAN-FD bus.

FIGS. 3A-3D illustrate example embodiments having two antennas configured to transmit and/or receive signals with one or more TPMS sensors. As discussed above, a signal strength value between a TPMS sensor and an antenna can be used to determine a distance between the antenna and the TPMS sensor. When the distance is known, and the position of the antenna is known, the location of the TPMS sensor relative to the vehicle can be determined. In this manner, the TPMS sensors and wheel can be localized.

FIG. 1 illustrates a position of the antenna with respect to the TPMS sensors such that all four sensors 102A-D are at a different distance from the antenna. As such, all four TPMS sensor and wheels can be localized.

However, in some cases an accuracy or sensitivity of the signal strength measurement may have a region or area in which the TPMS sensor location may be determined. For instance, there may be a margin of error (e.g., one or two feet) in the distance measurement based on a given signal strength measurement. If the distance between the antenna and a first TPMS sensor is within a foot of the distance between the antenna and a second TPMS sensor, the signal strength measurements may lead to a mix-up or incorrect determination of the position of the TPMS sensor.

Another source of possible error in the determined location of the TPMS sensors may be due to the rotation of the TPMS sensor as the vehicle moves. The distance between a given TPMS sensor and the antenna may oscillate between a maximum and a minimum distance based on the rotation of the tire.

To counteract the sources of error described above, one or more actions may be taken. First, rather than a single measurement or determination, the signal strength for each TPMS sensor may be determined over a period of time. The average signal strength (or some other mathematical operation) may then be determined to give a more precise and reliable estimate of the distance from the TPMS sensor to the antenna.

Second, either in addition to or alone, a second antenna may be used and a second set of signal strength measurements may be determined. This is illustrated in FIGS. 3A-D.

Figure 3A:
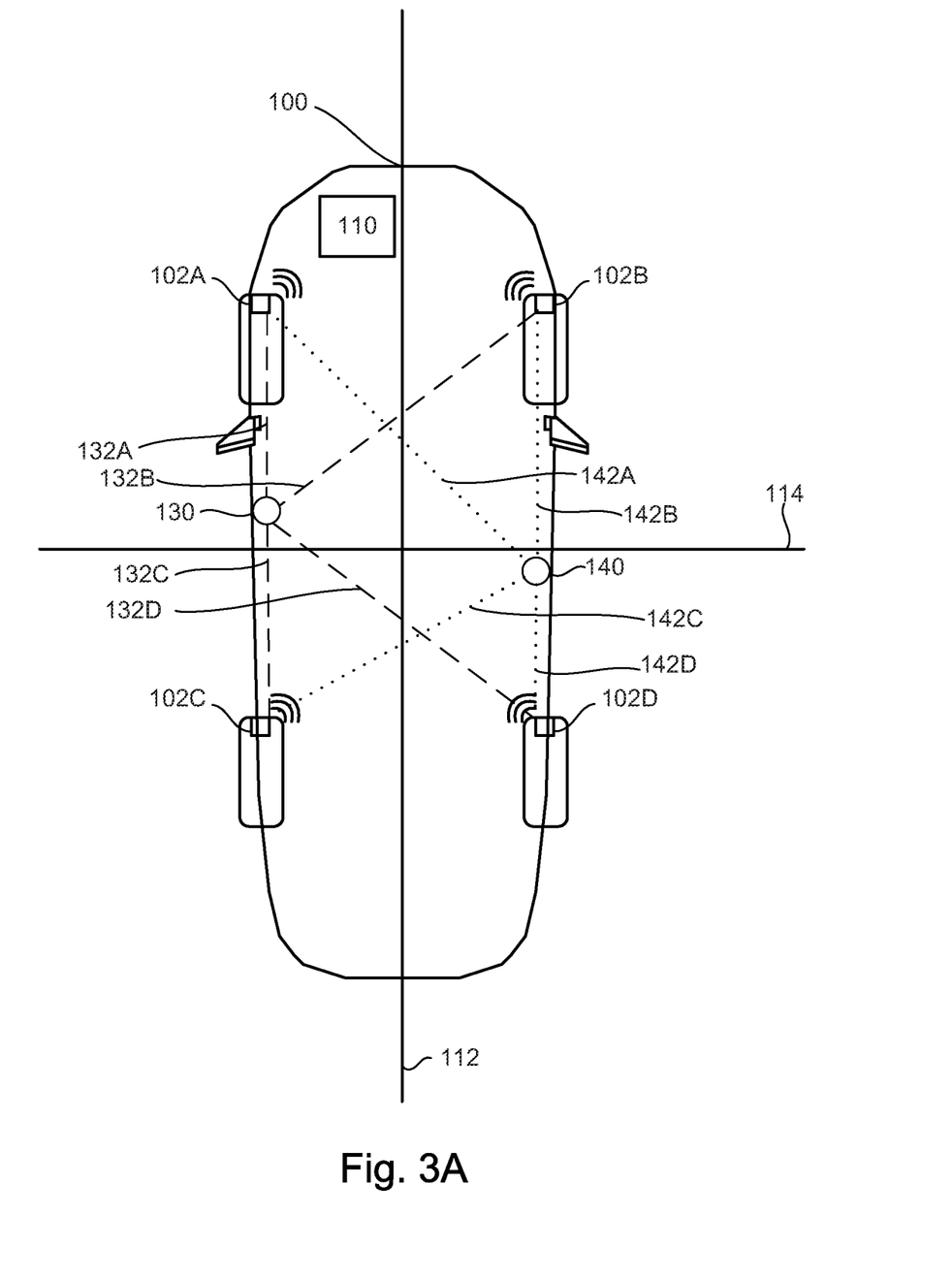
FIGS. 3A-D illustrate example antenna arrangements according to embodiments of the present disclosure.

FIG. 3A illustrates a first antenna 130 configured to transmit signals to the four TPMS sensors 102A-D. These signals are shown as signals 132A-D. A second antenna 140 may also be included, and configured to transmit signals to TPMS sensors 102A-D. The second set of signals is shown as signals 142A-D. Processor 110 may then be configured to determine a first set of signal strength values based on signals 132A-D, and a second set of signals strength values based on signals 142A-D. Processor 110 may then determine the location of each of the TPMS sensors based on both the first and the second sets of signal strength values. The second set of signal strength values may act as a check or additional data point in order to provide a more accurate and robust determination of the TPMS sensor locations.

FIG. 3A also shows that the first sensor 130 may be adjacent to a first side of the plane of symmetry 114, while the second antenna 140 is adjacent to a second (opposite) side of the same plane of symmetry 114. This may provide additional robustness.

Figure 3B:
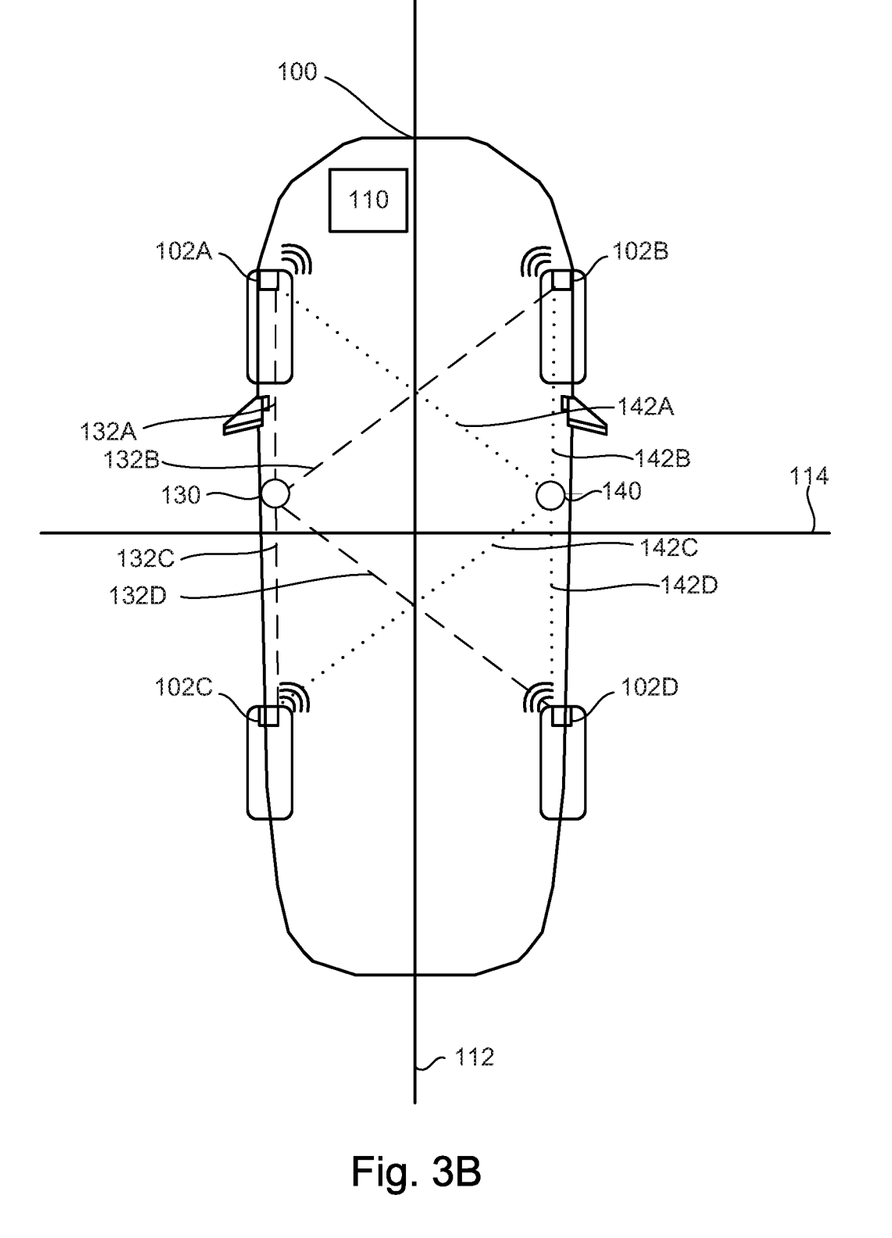

Alternatively, as shown in FIG. 3B, both the first antenna 130 and the second antenna 140 may be adjacent to the same side of the plane of symmetry 114. In both FIGS. 3A and 3B, the antennas may be located near a midpoint of the vehicle toward an outboard zone, such as on the door or outer undercarriage.

Figure 3C:
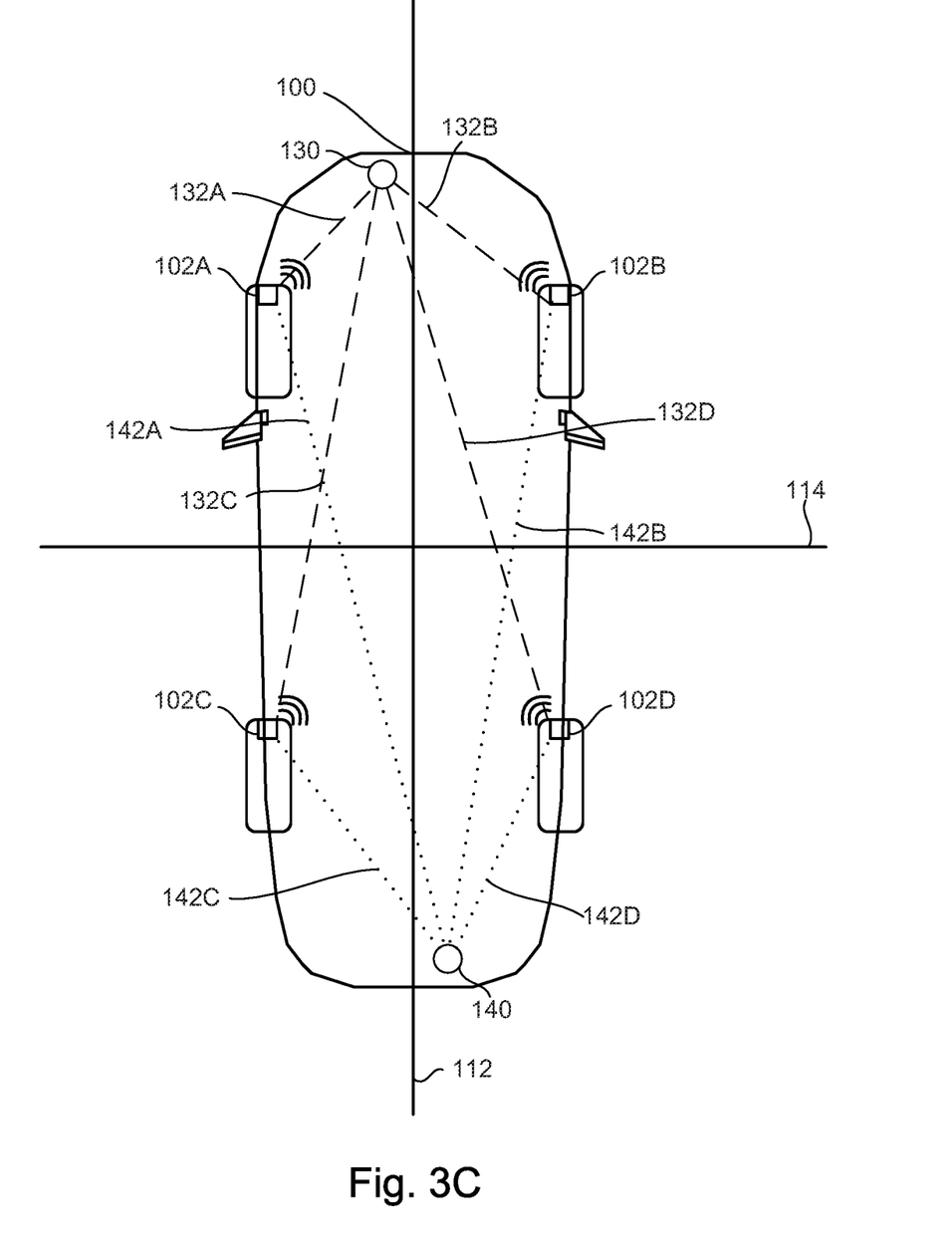
Figure 3D:
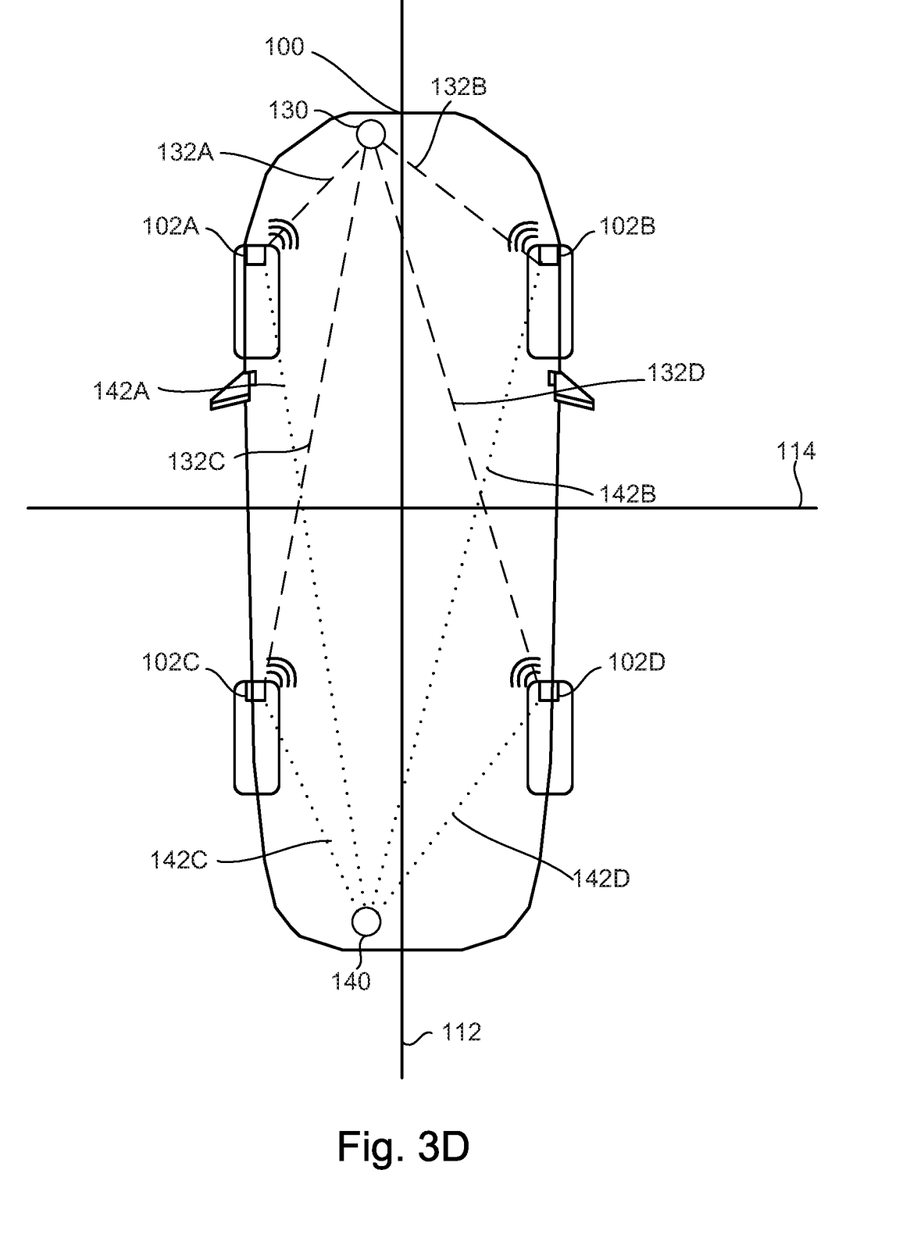

FIGS. 3C and 3D illustrate that the position of the antennas 130 and 140 may be at a front and rear of the vehicle. In FIG. 3C, antennas 130 and 140 may be adjacent to opposite sides of the same plane of symmetry 112. While in FIG. 3D, antennas 130 and 140 are shown adjacent to the same side of the plane of symmetry 112.

Figure 4:
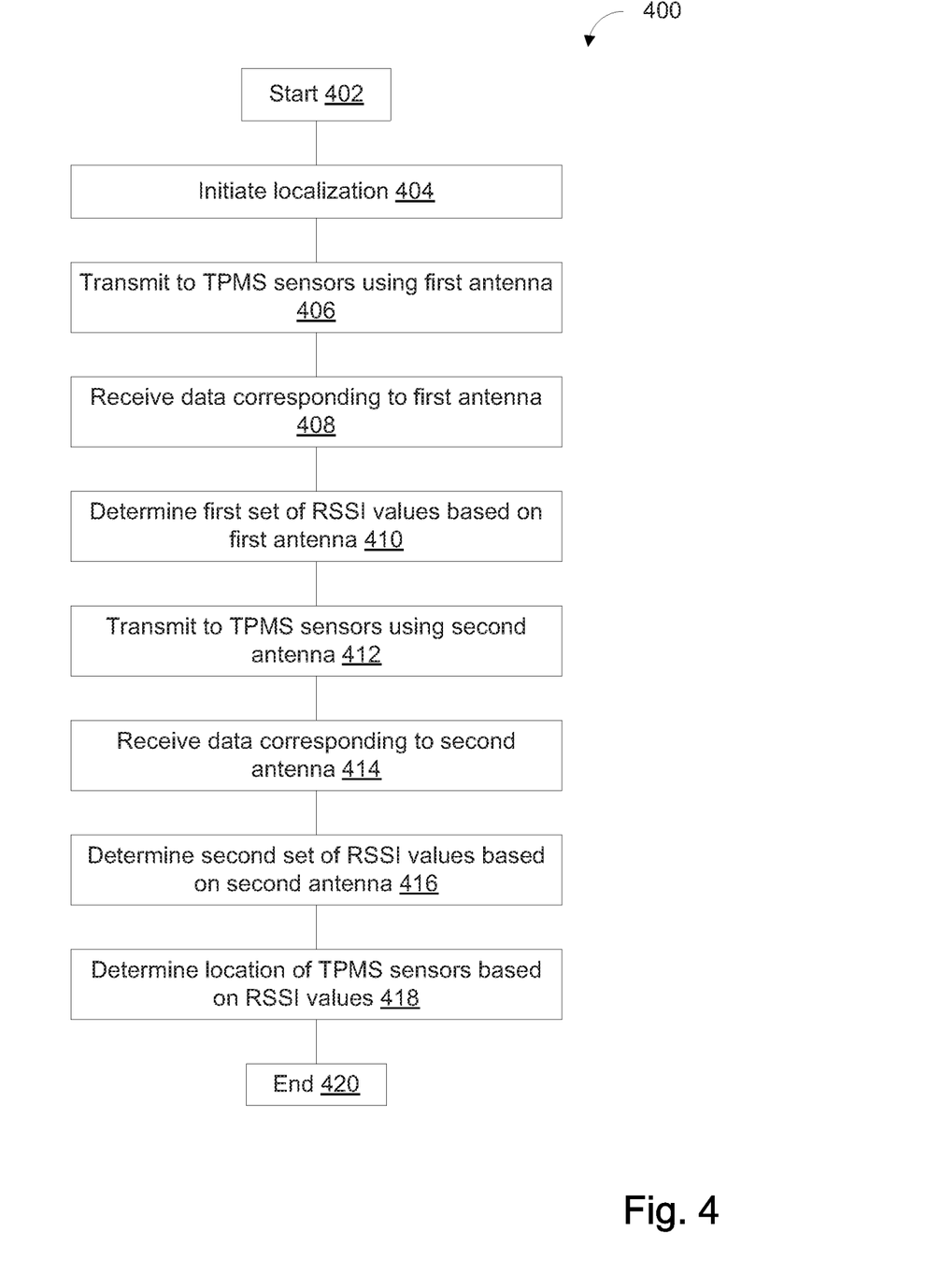
FIG. 4 illustrates a flowchart of an example method according to embodiments of the present disclosure.

FIG. 4 illustrates a flowchart of an example method 400 according to embodiments of the present disclosure. Method 400 may allow one or more TPMS sensors to be localized to corresponding vehicle tires. The flowchart of FIG. 4 is representative of machine readable instructions that are stored in memory (such as memory 212) and may include one or more programs which, when executed by a processor (such as processor 110) may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include initiating localization. This may include receiving an input (e.g., via user interface 224) indicating that localization should be performed. In some examples, localization may be performed automatically based on an engine startup, or based on a particular schedule (e.g., once per day, week, month, etc).

At block 406, method 400 may include transmitting to the plurality of TPMS sensors using a first antenna. The first antenna may be used to transmit a wakeup request and/or other data. At block 408, method 400 may include receiving data corresponding to the first antenna. This may include receiving, by a vehicle processor, data corresponding to the signal between the first antenna and the TPMS sensors, which may be used to determine RSSI value at block 410. The RSSI values may be determined by the processor, which can include determination by the TPMS sensors themselves, or by one or more other vehicle processors.

At block 412, method 400 may include transmitting to the TPMS sensors using a second antenna. This may be similar or identical to block 406. At block 414, method 400 may include receiving the data transmitted by the second antenna, and at block 416 method 400 may include determining a second set of RSSI values based on the data received from the second antenna.

At block 418, method 400 may include determining a location of each of the plurality of TPMS sensors based on the first and second set of RSSI values. In some examples, only one antenna may be used. In that case, the location of the TPMS sensors may be determined based on RSSI values determined on signals from a single antenna. Method 400 may then end at block 420.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a plurality of TPMS sensors;
   a first antenna, wherein distances between the first antenna and any two of the plurality of TPMS sensors are different;
   a second antenna, wherein distances between the first antenna and any two of the plurality of TPMS sensors are different; and a processor for:
determining a first set of signal strength values between each of the plurality of TPMS sensors and the first antenna;
determining a second set of signal strength values between each of the plurality of TPMS sensors and the second antenna; and
based on the first set and the second set of signal strength values, determining a location of each of the plurality of TPMS sensors.

2. The vehicle of claim 1, wherein the first antenna is adjacent to a plane of symmetry between the plurality of TPMS sensors.

3. The vehicle of claim 2, wherein the plane of symmetry is a first plane of symmetry that bisects the vehicle into a left side and a right side, a second plane of symmetry bisects the vehicle into a front side and a back side, and wherein the first antenna is closer to the first plane of symmetry than the second plane of symmetry, and the first antenna and the second antenna are located away from the first plane of symmetry and the second plane of symmetry.

4. The vehicle of claim 2, wherein the plane of symmetry bisects the plurality of TPMS sensors into first and second sensor groupings each having the same number of TPMS sensors.

5. The vehicle of claim 2, wherein the plane of symmetry is a first plane of symmetry that bisects the vehicle into a left side and a right side, a second plane of symmetry bisects the vehicle into a front side and a back side, and wherein the first antenna is closer to the second plane of symmetry than the first plane of symmetry, and the first antenna and the second antenna are located away from the first plane of symmetry and the second plane of symmetry.

6. The vehicle of claim 1, wherein a distance between the first antenna and each of the plurality of TPMS sensors is different.

7. The vehicle of claim 1, wherein the first antenna is a long range antenna configured for use in a remote parking procedure.

8. The vehicle of claim 1, wherein the first antenna is adjacent to a first side of a plane of symmetry between the plurality of TPMS sensors, and wherein the second antenna is adjacent to a second side of the plane of symmetry.

9. The vehicle of claim 1, wherein the first antenna is in a first position on a first plane of symmetry, and the second antenna is in a second position on a second plane of symmetry, wherein the first and second position are different, the first and second planes of symmetry are different, and the first and second planes of symmetry bisect the plurality of TPMS sensors respectively into two groups of TPMS sensors.

10. A method for monitoring a location of a plurality of vehicle tires comprising:
determining a first set of signal strength values between each of a plurality of TPMS sensors and a first antenna coupled to a vehicle, the TPMS sensors each corresponding to a respective vehicle tire, wherein distances between the first antenna and any two of the plurality of TPMS sensors are different;
determining a second set of signal strength values between each of the plurality of TPMS sensors and a second antenna, wherein distances between the first antenna and any two of the plurality of TPMS sensors are different; and
based on the first set and the second set of signal strength values, determining the location of each of the plurality of TPMS sensors.

11. The method of claim 10, wherein the first antenna is adjacent to a plane of symmetry between the plurality of TPMS sensors.

12. The method of claim 11, wherein the plane of symmetry is a first plane of symmetry that bisects the vehicle into a left side and a right side, a second plane of symmetry bisects the vehicle into a front side and a back side, and wherein the first antenna is closer to the first plane of symmetry than the second plane of symmetry.

13. The method of claim 11, wherein the plane of symmetry is a first plane of symmetry that bisects the vehicle into a left side and a right side, a second plane of symmetry bisects the vehicle into a front side and a back side, and wherein the first antenna is closer to the second plane of symmetry than the first plane of symmetry.

14. The method of claim 10, wherein a distance between the first antenna and each of the plurality of TPMS sensors is different.

15. The method of claim 10, wherein the first antenna is a long range antenna configured for use in a remote parking procedure.

16. The method of claim 10, wherein the first antenna is adjacent to a first side of a plane of symmetry between the plurality of TPMS sensors, and wherein the second antenna is adjacent to a second side of the plane of symmetry.

17. The method of claim 10, wherein the first and second antennas are both adjacent to a first side of a plane of symmetry between the plurality of TPMS sensors.

18. The method of claim 10, further comprising:
receiving, by a vehicle communication module, data from the plurality of TPMS sensors via BLUETOOTH.

* * * * *